US008527319B2

(12) United States Patent
Shinkawa

(10) Patent No.: US 8,527,319 B2
(45) Date of Patent: Sep. 3, 2013

(54) TWO-LEG MULTILEVEL MARKETING ORGANIZATION CONSTRUCTION SYSTEM

(75) Inventor: Satoshi Shinkawa, Fukushima (JP)

(73) Assignee: Pure Crystal Co., Ltd., Fukushima (JP)

( * ) Notice: Subject to any disclaimer, the term of this patent is extended or adjusted under 35 U.S.C. 154(b) by 1494 days.

(21) Appl. No.: 11/577,778

(22) PCT Filed: Oct. 11, 2005

(86) PCT No.: PCT/JP2005/018995
§ 371 (c)(1),
(2), (4) Date: Apr. 23, 2007

(87) PCT Pub. No.: WO2006/043488
PCT Pub. Date: Apr. 27, 2006

(65) Prior Publication Data
US 2009/0106057 A1    Apr. 23, 2009

(30) Foreign Application Priority Data

Oct. 22, 2004   (JP) .................................. 2004 336649
Mar. 16, 2005   (JP) .................................. 2005 74199

(51) Int. Cl.
*G06Q 30/00*   (2012.01)
*G06Q 10/00*   (2012.01)

(52) U.S. Cl.
USPC ..................................... 705/7.29; 705/14.16

(58) Field of Classification Search
USPC ............................................ 705/14.16, 7.29
See application file for complete search history.

(56) References Cited

U.S. PATENT DOCUMENTS

| | | | | |
|---|---|---|---|---|
| 3,597,759 | A | * | 8/1971 | Hause .......................... 345/589 |
| 5,537,314 | A | * | 7/1996 | Kanter ....................... 705/14.13 |
| 5,555,357 | A | * | 9/1996 | Fernandes et al. ............ 345/441 |
| 5,557,786 | A | * | 9/1996 | Johnson, Jr. ......................... 1/1 |
| 6,421,648 | B1 | * | 7/2002 | Gagnon et al. ................. 705/1.1 |
| 6,578,010 | B1 | * | 6/2003 | Teacherson ................ 705/14.16 |
| 6,980,962 | B1 | * | 12/2005 | Arganbright et al. .......... 705/26 |
| 7,774,229 | B1 | * | 8/2010 | Dernehl et al. ............. 705/14.16 |
| 2003/0075868 | A1 | * | 4/2003 | Lipps ........................... 273/256 |
| 2003/0191687 | A1 | * | 10/2003 | Pavone .......................... 705/14 |
| 2004/0103022 | A1 | * | 5/2004 | Chilcoat et al. ................ 705/14 |
| 2004/0158537 | A1 | * | 8/2004 | Webber et al. ................ 705/400 |
| 2005/0222967 | A1 | * | 10/2005 | Adir ................................. 707/1 |
| 2006/0235749 | A1 | * | 10/2006 | Moc ............................... 705/14 |

FOREIGN PATENT DOCUMENTS

| | | |
|---|---|---|
| JP | 2002 259784 | 9/2002 |
| JP | 2002 259786 | 9/2002 |
| JP | 2002 259787 | 9/2002 |
| JP | 2002-304512 | 10/2002 |
| JP | 2002 329052 | 11/2002 |
| JP | 2003 122883 | 4/2003 |

* cited by examiner

*Primary Examiner* — Justin M Pats
*Assistant Examiner* — Folashade Anderson
(74) *Attorney, Agent, or Firm* — Norris McLaughlin & Marcus, P.A.

(57) ABSTRACT

A two-leg MLM organization construction system encourages a member who puts in effort in recruiting members by offering a chance to drastically increase bonus earnings. New first and second positions are provided between the position of the upper level member and the positions that are immediate right and left to the upper level member. These new first and second positions are initially set to an OFF-state position. When the number of positions filled with recruited members reaches a predetermined level, the new first and second positions are turned to on ON-state position.

3 Claims, 4 Drawing Sheets

--Prior Art--

TWO-LEG MULTILEVEL MARKETING ORGANIZATION CONSTRUCTION SYSTEM

TECHNICAL FIELD

The present invention relates to a two-leg multilevel marketing (hereinafter referred to as MLM) organization construction system.

BACKGROUND ART

In a conventional method for constructing an MLM organization, the organization is expanded by placement of a member, personally receiving referral from a referrer, in a position immediately below the referrer. However, this method has a drawback in that, if there is a member who is unable to make a referral, further downline of the member cannot be created and the organization fails to grow.

Meanwhile, a bi-directional MLM organization construction scheme, referred to as a distribution-of-profits-type binary system, limits the referrer lines that are formed in the downline of a member to two legs. For example, in the system, if a first member recruits two other people who will become members, and then a third referrer is recruited, the third referrer is placed below the two members already registered in the downline (Japanese Patent Application Laid-Open (kokai) No. 2002-259784, Japanese Patent Application Laid-Open (kokai) No. 2002-259786, Japanese Patent Application Laid-Open (kokai) No. 2002-259787, Japanese Patent Application Laid-Open (kokai) No. 2002-329052, and Japanese Patent Application Laid-Open (kokai) No. 2003-122883).

In the above-mentioned prior art system, if the first member fails to recruit a potential member, a referrer from an upper level automatically descends to his/her downline and is placed there. Therefore, this system has a drawback in that, as the organization grows larger, the two-leg downlines multiply and expand in a lateral direction in the lower levels of the organization.

To overcome the problems involved in the foregoing binary system, an improved two-leg multilevel marketing organization construction system has previously been proposed. According to the proposed system, legs of a first direction, among the legs extending directly from the position of an upper level member in right and left directions, are referred to as first and second referrer legs of the upper level member. Legs of a second direction are short legs, and in such a short leg, a person who is recruited by a member positioned in the level directly above a certain position of the short leg is placed in that position of the short leg. In a position of the first leg and a position of the second leg that form a position pair in the same level of the two referrer legs of the upper level member, persons recruited by any member belonging to the first or second referrer leg are automatically placed.

The prior art system will further be described with reference to FIG. 4. A left leg starting from the immediate left side of the position of an upper level member A and extending in the lower left direction is referred to as a first referrer leg 5. Similarly, a left leg starting from the immediate right side of the position of the upper level member A and extending in the lower left direction is referred to as a second referrer leg 6. Right legs starting from respective positions in the first referrer leg 5 and the second referrer leg 6 are referred to as short legs 7, and a new member recruited by the member positioned in a level directly above a certain position of a short leg 7, is placed in that position of the short leg 7.

In each position of the first referrer leg 5 and the second referrer leg 6, a new member recruited by a member of a corresponding referrer line is placed. The placement sequence may be such that the first acquired member recruited by the upper level member A is placed in a position in the first referrer leg 5, the second acquired member recruited by the member A is placed in a position in the second referrer leg 6, and then, the third acquired member recruited by the member A is placed in a position in the first referrer leg 5. In this way, new members recruited by a member of each referrer leg are placed in positions belonging either to the first referrer leg 5 or the second referrer leg 6. A bonus is generated when a member is placed in a position that forms a pair with a corresponding position in the same level of the first referrer leg 5 and the second referrer leg 6 of the upper level member A.

When a member is placed in one position in the lowest level of the first referrer leg 5 or the second referrer leg 6 and a corresponding position with which the position is to be paired is vacant, the next acquired person recruited by the upper level member A is preferentially placed in the vacant position, and the bonus is generated.

The foregoing will be described in detail with reference to FIG. 4. First, B, followed by C, is acquired through referral from the upper level member A. In this case, B is placed in a position that is immediate lower left to the position of A; C is placed in a position that is immediate lower right to the position of A; and the first bonus is generated. At the same time, as the left leg of B, a first referrer leg 5 of the upper level member A is formed; and as the left leg of C, a second referrer leg 6 of the upper level member A is formed. According to this placement scheme, D recruited by a member—for example, A or B—belonging to the first referrer leg 5 is placed in a position that is immediate lower left to B; and E recruited by a member—for example, A or C—belonging to the second referrer leg 6 is automatically placed in a position that is immediate lower left to C. At this point, the second bonus is generated. Likewise, G and H, and then K and L, recruited successively by their upper level members, are placed in two mutually corresponding positions in the same level of the first referrer leg 5 and the second referrer leg 6, and bonuses are respectively generated.

Therefore, with the above-described system, when the organization expands, the first referrer leg 5 and the second referrer leg 6 as shown in, for example, FIG. 4, extend downward to lower levels. However, unlike the case of the binary system described above, the downline of the two legs do not expand laterally.

Japanese Patent Application Laid-Open (kokai) No. 2002-259784, Japanese Patent Application Laid-Open (kokai) No. 2002-259786, Japanese Patent Application Laid-Open (kokai) No. 2002-259787, Japanese Patent Application Laid-Open (kokai) No. 2002-329052, and Japanese Patent Application Laid-Open (kokai) No. 2003-122883.

The above system is configured such that, after a member is placed in one of the two positions forming a position pair in the same level of the first referrer leg 5 and the second referrer leg 6 and subsequently a new person recruited as a member is placed to fill the counterpart position, a bonus is generated. Thus, with this prior art system, members who put in effort to recruit and enroll many people as new members and members who do not are not differentiated in a related organization construction program.

In other words, with the prior art system, members who put in effort can merely expect an additional type increase in their earnings calculated according to a predetermined formula, but cannot expect a rapid increase in earnings for their efforts.

DISCLOSURE OF THE INVENTION

In view of the foregoing, the present invention provides a two-leg multilevel marketing organization construction system which comprises a first referrer leg and a second referrer leg provided for an upper level member, each of the legs starting from each of the immediate lower right and immediate lower left positions to the position of the upper level member, and short legs;

said first or second referrer leg being a unidirectional leg extending in either direction of right or left, and each of the short legs extending in the other direction and being provided such that a person who is recruited by a member positioned in the level directly above a position in the short leg is placed in that position of the short leg;

and in a position of the first referrer leg and a position of the second referrer leg that form a position pair in the same level of these two referrer legs provided for the upper level member, a person recruited by any member belonging to the first or second referrer leg is automatically and correspondingly placed; a new position is created between the position of the upper level member and at least one of the immediate lower right and lower left positions with respect to the upper member, and in either one of the first and second referrer legs, when the number of positions filled with acquired members has reached a predetermined level, a new leg is branched out from said new position, and the leg of a first direction, which extends unidirectionally, serves as a referrer leg for the upper level member.

In other words, in a referrer leg, when the number of positions at which the recruited members have been placed reaches a predetermined level, a new unidirectional leg is branched out from a position provided between the position of the upper level member and the position that is immediate lower left or the lower right with respect to the position of the upper level member, and the thus-created new unidirectional leg is employed as an additional referrer leg to be used by the upper level member.

Therefore, according to the present invention, provided that a certain predetermined number of positions in either one of the existing referrer legs has been filled with members, a bonus is generated each time when a new member recruited by the upper level member is placed automatically in a position which belongs to the newly created referrer leg and which is to form a pair with a position in the exiting leg. Therefore, recruiting efforts of the upper level member will further be prompted, whereby the newly formed referrer leg can be acceleratingly elongated.

Furthermore, in the counterpart referrer leg of the first referrer leg, when the number of positions at which the recruited members have been placed reaches a predetermined level that is more demanding than the above-mentioned level, a separate leg is newly branched out from another position provided between the position of the upper level member and the counterpart position that is immediate lower right or the lower left with respect to the position of the upper level member, and the thus-created second new unidirectional leg is employed as a further additional referrer leg to be used by the upper level member. Thus, since new referrer legs can be added in two stages, elongation of legs can be accelerated.

To implement the above scheme, the software of the present invention is written as follows. The positions which are immediate lower left and lower right to the upper level member within an organization construction program are initially set to be non-functional; i.e., OFF state. When the positions in either right or left referrer leg in which recruited members are placed reach a certain level, the position in OFF state is turned ON to begin functioning, and a new leg is branched out from the thus-activated position (i.e., the ON state position). The new leg of positions, which is a unidirectional leg, is reserved for the upper level member for placing members he or she recruited, and when the number of positions in the referrer leg at which the recruited members have been placed reaches a predetermined level that is more demanding, the other position that is initially OFF is set to turn ON and to begin functioning. Another new, unidirectional leg is branched out from this position; i.e., that has just been turned ON, and this unidirectional leg is also used as a referrer leg of the upper level member.

EFFECT OF THE INVENTION

According to the present invention, if a predetermined condition is met, an upper level member can receive a bonus simply by acquisition of a new member. Thus, the achievement made through his or her efforts is rewarded doubly, further prompting the member's motivation to participate in the construction of the organization.

Furthermore, since the above organization construction is effected in two stages by activating (i.e., turning ON) the other position, in the mentioned two positions which are immediate lower left and lower right to the upper level member, when a certain predetermined lower level that is more demanding has been reached, motivation to participate in constructing the organization can be made long-lasting.

DESCRIPTION OF REFERENCE NUMERALS

Figure 1:
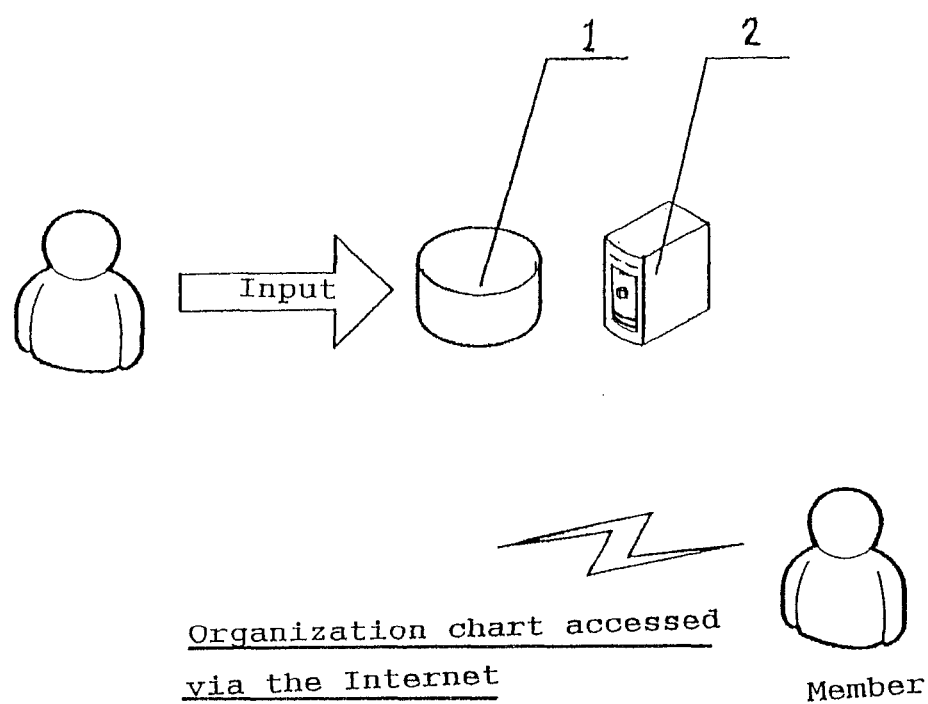
FIG. 1 is an explanatory diagram of a two-leg MLM organization construction system device according to the present invention.

1: Main computer including a two-leg MLM organization construction program
2: Web server
3 and 4: OFF positions
5: First referrer leg
6: Second referrer leg
7: Short legs
8 and 9: New first and second referrer legs created through branching out

BEST MODE FOR CARRYING OUT THE INVENTION

In a two-leg multilevel marketing organization construction system, a leg of a first direction, among the legs extending in right and left directions from each of two positions situated immediate right and left to an upper level member is referred to as a first (or second) referrer leg. Legs of a second direction are short legs, and in such a short leg, a member, recruited by a member positioned in a level directly above a certain position of the short leg, is placed in that position of the short leg. A member recruited by a member in the first or second referrer leg is automatically placed in a position that forms a pair in the same level of the first and the second referrer lines of the upper level member. In the system, a new position is provided between the position of the upper level member and either one position or each of the two positions that is/are immediate lower left and/or the lower right to the position of the upper level member. Any of such newly created positions is initially set OFF. When the positions within a referrer leg in which the recruited members have been placed reach a certain level, the mentioned OFF position is turned ON and activated to branch out. That is, a new leg branches out from the position that is turned ON. A leg of a first direction, among other branched legs, is employed as a referrer leg of the upper level member. When the positions in the referrer leg in which recruited members are placed reach a number of levels that is determined according to more demanding criteria, the counterpart OFF position is now turned ON and activated, whereby a separate leg is newly branched out from the position that has just been turned ON. A leg of a first direction, among the thus-branched legs, is employed as another referrer leg of the upper level member.

EMBODIMENTS

An embodiment of the present invention will be described hereinafter.

Embodiment 1

An embodiment of the present invention will next be described in detail with reference to the appended drawings. Reference numeral 1 denotes a main computer that includes a two-leg MLM organization construction program. Reference numeral 2 denotes a web server. When a person (hereinafter referred to as A) is recruited by a referrer and enrolled as a distributor, registration of A is completed when distributor information items, such as address, name, registration number, registration fee payment status, and bank account information for bonus deposit purposes, are inputted into the main computer, thereby enabling the system to cope with organization expansion activities of member A. In addition, members have an access to an organization chart through the Internet.

Figure 2:
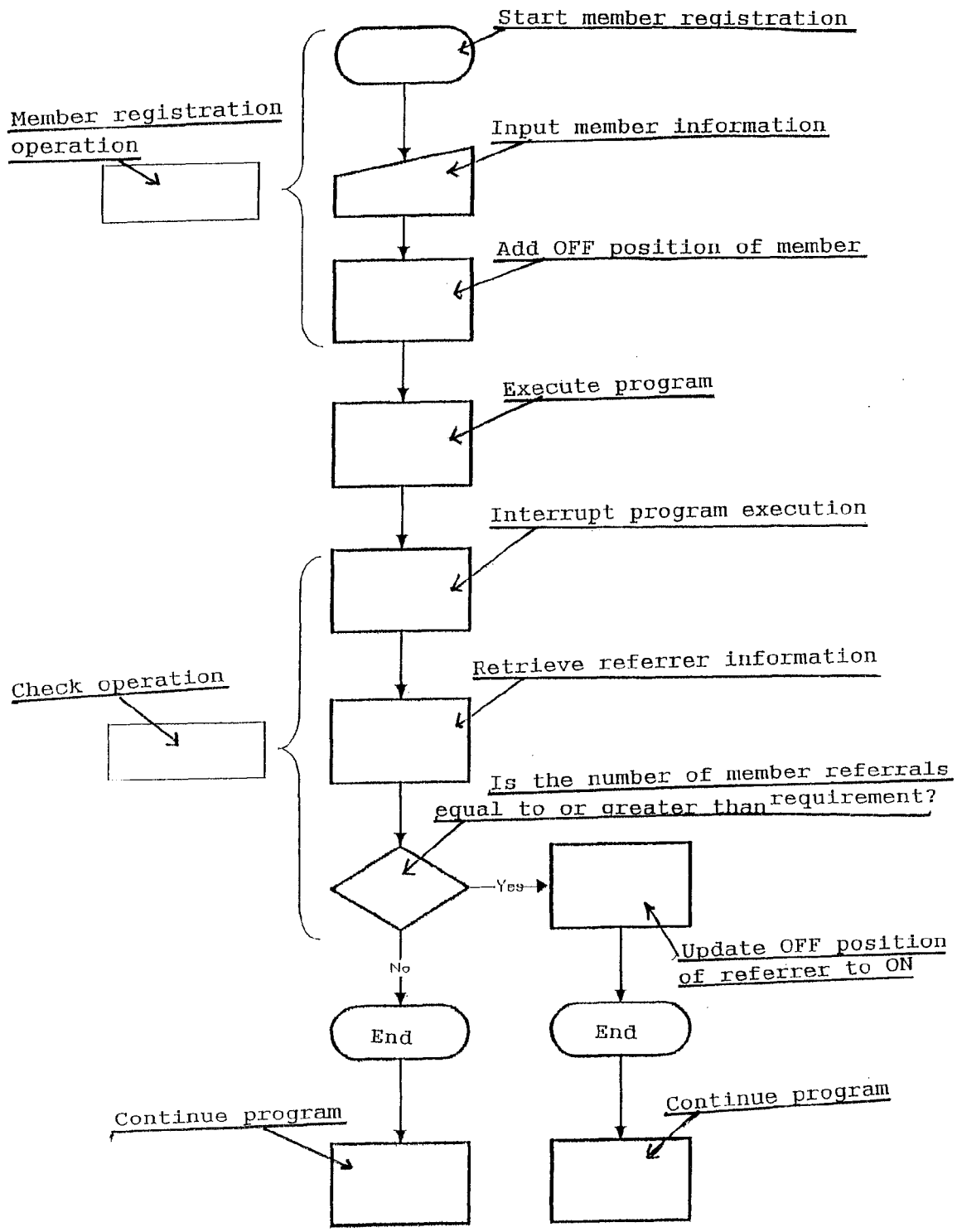
FIG. 2 is a flowchart of a two-leg MLM organization construction program according to the present invention.
Figure 3:
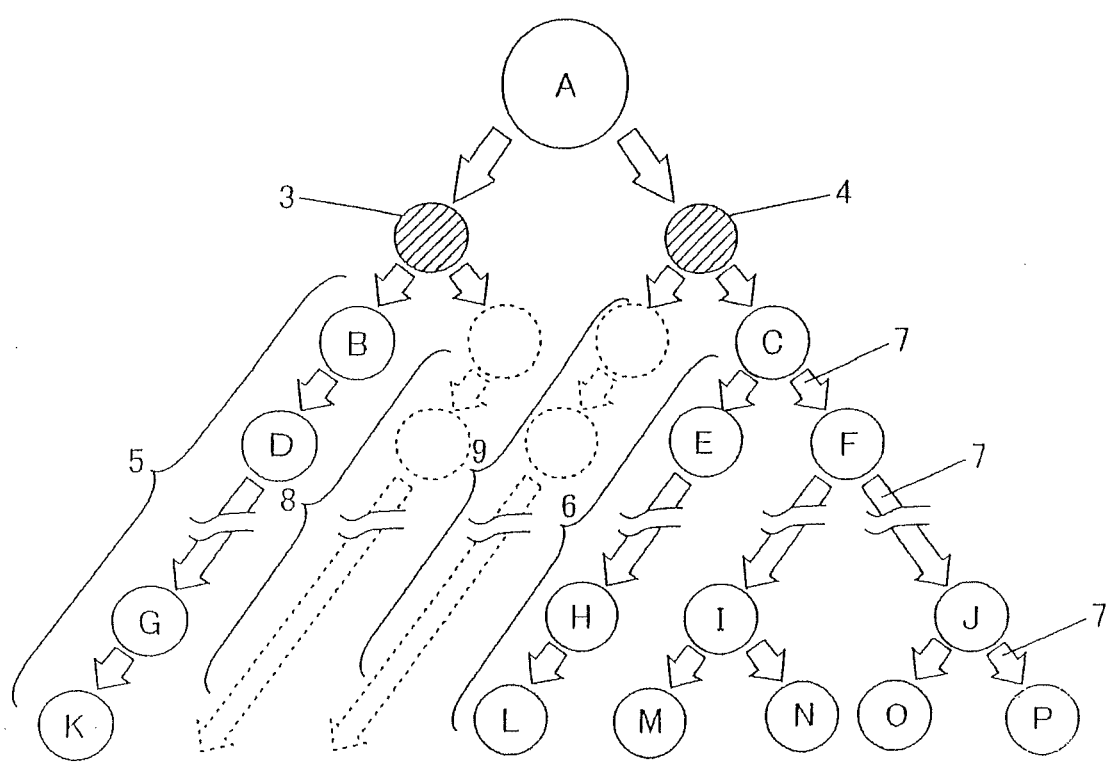
FIG. 3 is a diagram showing exemplary organization construction using the two-leg MLM organization construction program of the present invention.
Figure 4:
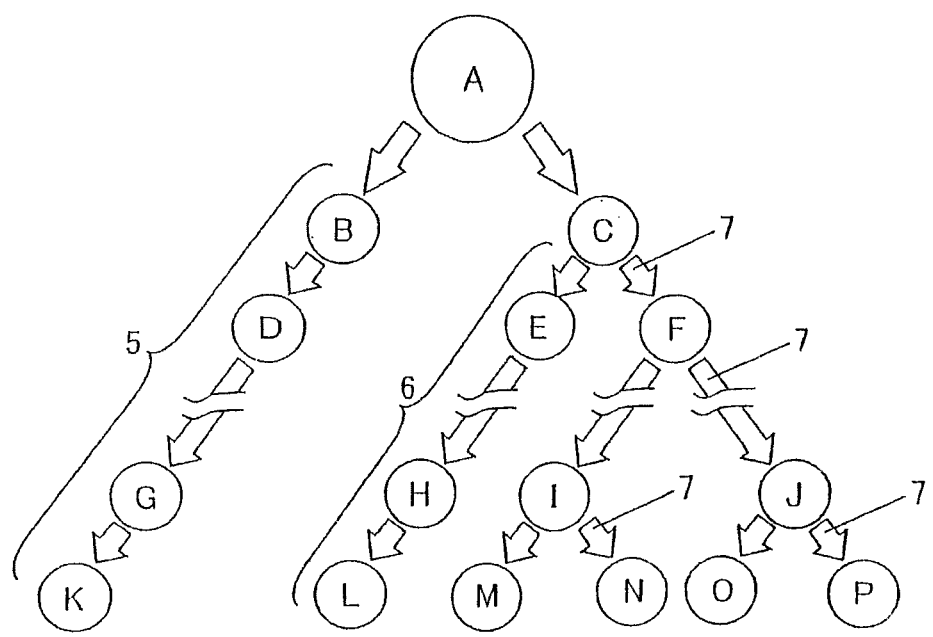
FIG. 4 is a diagram showing exemplary organization construction using a conventional two-leg MLM organization construction program.

Next, a flowchart of the two-leg MLM organization construction program according to the invention will be described with reference to FIGS. 2 and 3. The program is broadly divided into a member registration operation, a program execution operation, and a check operation.

In the member registration operation, when A is registered as a member of the MLM organization (start member registration), information regarding the registered member (including personal information) is inputted into the computer 1. The inputted information is recorded within a network system (input member information), and two OFF positions 3 and 4 are added directly below the registered A (see FIG. 3).

Although the OFF position is provided as a position, when the program is executed, the position is ignored—or skipped—and connection is made with the downline in the lower region. In other words, the position is in a dormant state.

An exemplary program execution operation will next be described with reference to FIG. 3. First, B, followed by C, is recruited through referral from the upper level member A. B is placed in a position that is lower left to the position of A, and then C is placed in a position that is lower right to the position of A. At this time, a first bonus is generated. At the same time, a first referrer leg 5 of the upper level member A is formed in the left leg of B, and a second referrer leg 6 of the upper level member A is formed in the left leg of C. A right leg extending from each position in the first referrer leg 5 or the second referrer leg 6 is a short leg 7. A member recruited by a member positioned in a level directly above a position in the short leg 7 is placed in that position of the short leg 7.

Next, D, recruited by A or B is placed in a position immediately below B in the first referrer leg 5. E, subsequently recruited by A or C is automatically placed in a position immediately below C in the second referrer leg 6. Here, a second bonus is generated. G and H, and K and L, recruited successively by their upper level members, are respectively placed in two positions in the same level of the first referrer leg 5 and the second referrer leg 6, and bonuses are respectively generated.

In the check operation, checking is performed as to whether there is a downline member that is connected to A, as well as the leg extension status ("retrieve referrer information"). Whether the number of levels or the number of the positions of members connected to the downline of A exceeds a predetermined requirement (for example, 50 levels) is checked ("Is the number of member referrals equal to or greater than requirement?")

If the number of member referrals is not equal to or greater than the predetermined condition, which is a first condition, the check operation is terminated and the program execution operation continues.

If the number of member referrals is equal to or greater than the first predetermined condition, the OFF position 3 is turned ON. Subsequently, when a second predetermined requirement is exceeded, the OFF position 4 is turned ON. Then, the check program is terminated and the program execution operation continues.

Connection is made to downline by turning ON the position 3 or 4. Thus, a new first referrer leg 8 that branches out from the position 3 and a new second referrer leg 9 that branches out from the position 4 are formed.

Then, because B, D, G, and K are already placed in the corresponding positions of the first referrer leg 5, a member recruited by the upper level member A is automatically placed in a position in the branched-out new first referrer leg 8. As a result, a pair is formed and a bonus is generated.

Similarly, because C, E, H, and L are already placed in the corresponding positions of the second referrer leg 6, a member recruited by the upper level member A is automatically placed in a position in the branched-out new second referrer leg 9. As a result, a pair is formed and a bonus is generated.

Therefore, according to the present invention, if a predetermined condition is satisfied, a bonus is offered as a result of simple acquisition of only one new member. Therefore, one's efforts are greatly prized, further motivating towards organization construction.

INDUSTRIAL APPLICABILITY

As described above, according to the present invention, a leg of a first direction, among the legs extending lower right and left directions from the position of an upper level member, is provided for the upper level member to be used as a first or second referrer leg, and a leg of a second direction is referred to as a short leg where a member recruited by a member positioned in a level directly above the position of the short leg is placed in that position of the short leg. In the same level of the first and the second referrer lines of the upper level member, a member recruited by a member in either of the referrer legs is automatically placed in a position that forms a pair. According to the present system, members who put effort in member acquisition can receive acceleratingly increased bonus earnings.

The invention claimed is:

1. A two-leg multilevel marketing organization construction system comprising a processor and a non-transitory computer-readable storage medium storing a computer program comprising code, which when executed, causes the processor to generate a two-leg multilevel marketing organization construction system comprising a first referrer leg for an upper level member, a second referrer leg for the upper level member and one or more short legs, wherein the first referrer leg is a unidirectional leg, starts from a first immediate lower position with respect to an upper position of the upper level member, and extends outwardly in a first direction, wherein the second referrer leg is a unidirectional leg, starts from a second immediate lower position with respect to the upper position of the upper level member, and extends outwardly in a second direction, wherein each of the short legs extends in another direction with respect to the first referrer leg or the second referrer leg and is provided such that a person recruited by a member positioned in a level directly above a position in the short leg is placed in that position of the short leg, add, when the upper level member is registered and information regarding the registered upper level member is inputted into a computer, at least one OFF-state position located between the upper position of the upper level member and at least one of the intermediate lower positions of the first referrer leg and the second referrer leg, automatically place, each time the upper level member acquires a newly acquired member, the newly acquired member at a position in the first referrer leg or the second referrer leg, in an alternating manner starting with the first referrer leg to form pairs at same levels of the first and second referrer legs, generate at least one first bonus when two corresponding positions in a same level of the first and second referrer legs have been filled by acquired members to form a pair in the same level of the first and second referrer legs;

perform, after a member is recruited by an upper level member and placed in one referrer leg selected from the first and second referrer legs,
(i) an information retrieval to determine (a) whether there is a recruited member placed in the one referrer leg, and (b) a leg extension status of the one referrer leg, and,
(ii) a checking operation to determine whether a number of levels or a number of the positions of the members present in the one referrer leg exceeds a predetermined requirement, turn the OFF-state position to an ON-state position if the number is equal to or greater than the predetermined requirement, and then branch a new branched-out referrer leg out from the one referrer leg, to thereby provide a position to be used in such a manner that, when the said upper level member acquires a new member, the new member is placed at a position in the branched-out referrer leg, and generate a second bonus when two corresponding positions in a same level of the branched-out referrer leg and the one referrer leg have been filled by acquired members to form a pair in the same level of the branched-out referrer leg and the one referrer leg.

2. The system according to claim 1, wherein the program comprises code, which when executed, causes the processor to generate an additional bonus when a member recruited by a member belonging to one of the first and second referrer legs is placed to thereby form a position pair with the same level counterpart position in the other one of the first and second referrer legs.

3. The system according to claim 1, wherein the unidirectional leg is a left-extending leg.

* * * * *